United States Patent [19]

Klein

[11] 3,825,961

[45] July 30, 1974

[54] FISHERMAN'S TOOL

[76] Inventor: Gerald B. Klein, 13451 Stuart Ct., Broomfield, Colo. 80020

[22] Filed: Nov. 15, 1972

[21] Appl. No.: 306,577

[52] U.S. Cl................... 7/1 H, 132/76.2, 132/75.5, 30/28, 7/14.1 R
[51] Int. Cl.............................................. B25f 1/00
[58] Field of Search............ 7/1 H, 1 P, 5.1, 5.2, 16, 7/14.1 R; 83/43; 30/28, 143; 132/75.4, 75.5, 76.2; 43/1, 4, 44.89

[56] References Cited
UNITED STATES PATENTS

| | | | |
|---|---|---|---|
| 1,380,232 | 5/1921 | Metcalf | 81/43 |
| 2,279,068 | 4/1942 | Siebrandt | 81/43 |
| 2,890,706 | 6/1959 | Guardino | 30/28 X |
| 3,042,047 | 7/1962 | Plaskon | 30/28 X |
| 3,316,634 | 5/1967 | Bliss | 30/28 X |
| 3,330,025 | 7/1967 | Williams | 7/5.1 X |

FOREIGN PATENTS OR APPLICATIONS

| | | | |
|---|---|---|---|
| 387,598 | 1/1924 | Germany | 132/75.5 |
| 243,901 | 12/1925 | Great Britain | 132/75.5 |

Primary Examiner—Al Lawrence Smith
Assistant Examiner—Roscoe V. Parker
Attorney, Agent, or Firm—Van Valkenburgh, Lowe & Law

[57] ABSTRACT

A tool, which may be used as a fisherman's tool, having an elongated handle which includes parallel cantilevered members extending from one end and lever means arranged to flex the members toward each other. The members are provided with surfaces for crushing or cutting fishing leader material and crimping split shot sinkers. Various blades are mounted within the handle similar to a jackknife for performing other useful functions.

5 Claims, 8 Drawing Figures

PATENTED JUL 30 1974 3,825,961
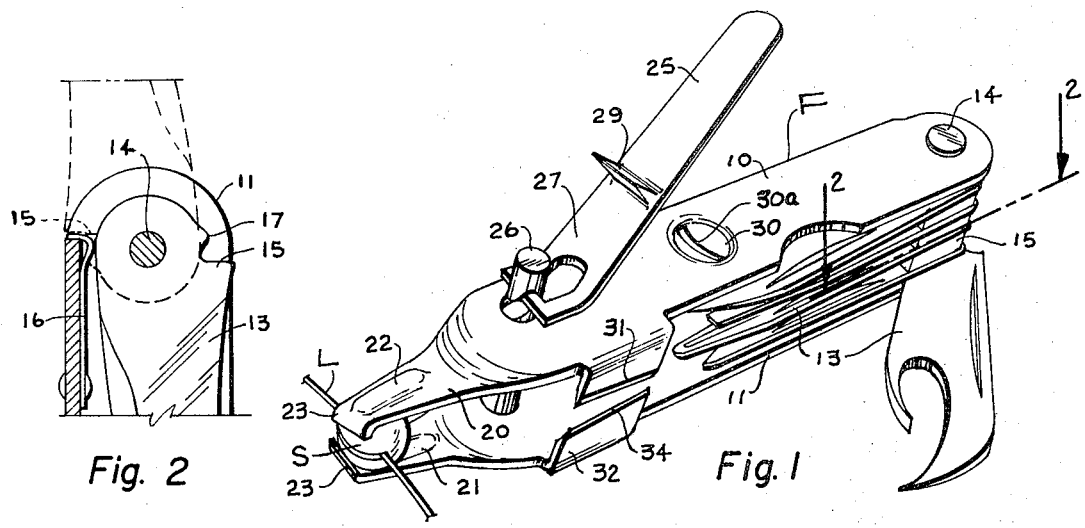
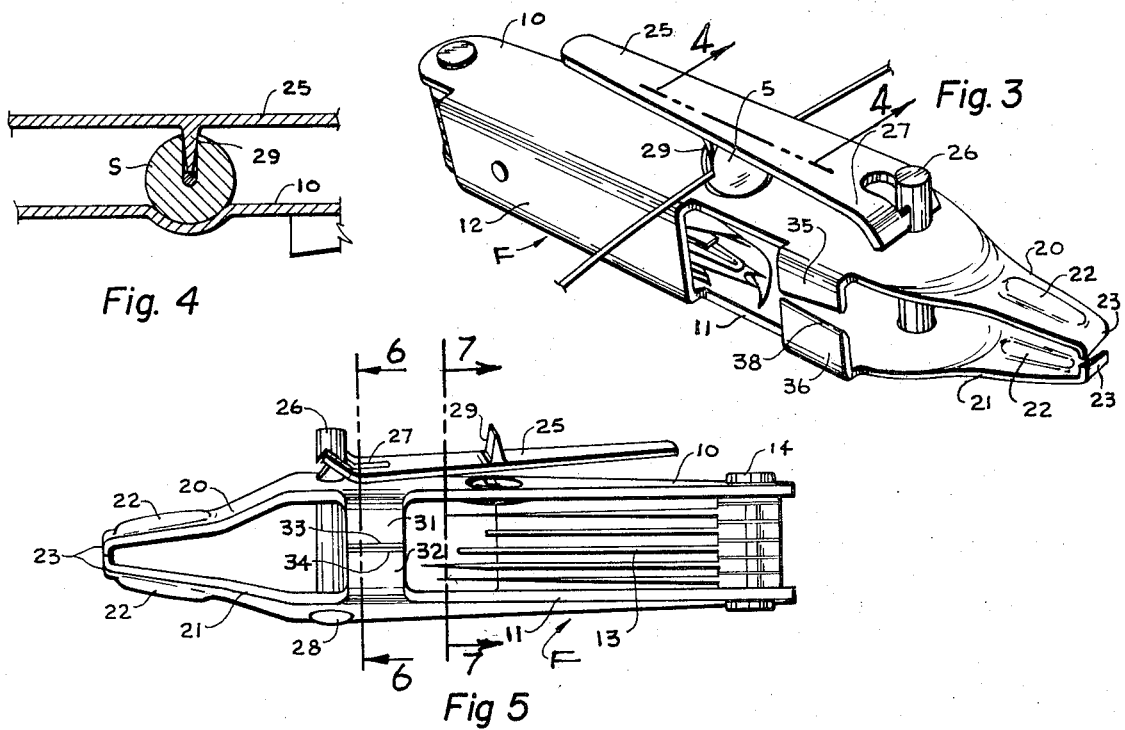
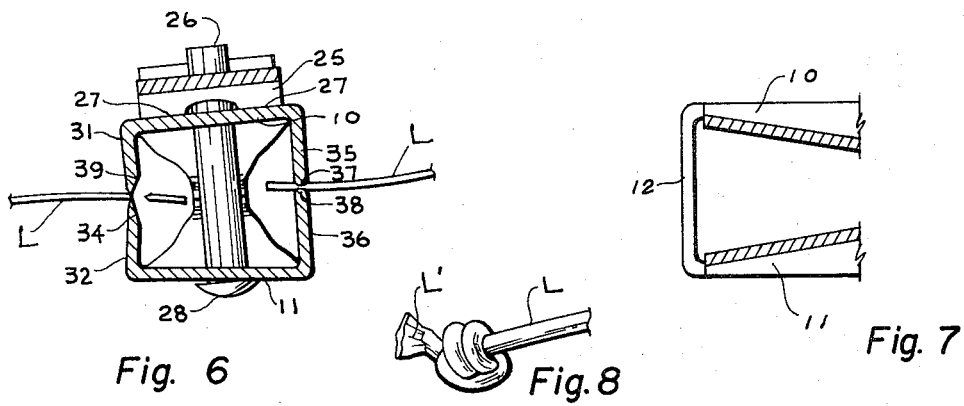

FISHERMAN'S TOOL

This invention relates to hand tools which may be used for working on fishing tackle, and which may be best described as apparatus for assisting a fisherman in preparing leaders, in attaching and removing split shot sinkers to and from the leaders, and in performing other similar operations. Thus, although the invention can be used for other purposes, it will be called a "Fisherman's Tool" and described as such.

A fisherman is often confronted with the necessity of preparing, changing and repairing his gear while he is fishing, especially if he is using lightweight tackle. He will often need to tie or repair a leader, attach or remove sinkers, and tie hooks and artificial lures onto the leaders. Problems are encountered in preparing such lightweight gear while the fisherman is in the field because tools are required to do this, and often, a single tool, such as a jackknife, is inadequate for the purpose. Multipurpose tools are available for fishermen, but they are objected to because they are bulky and awkward to use.

The preparation of leaders involves cutting strands of tough leader material such as nylon, and nipping short ends of the leader material after it is tied to connect with a line and to attach hooks and sinkers. Modern leaders are tough nylon filaments which have to be cut and have to be tied with special knots because the nylon filaments are slippery. It is especially difficult to cut away or nip a short end of the leader material after a knot is tied, and some fishermen carry nippers for this purpose.

Split shot sinkers are popular for lightweight tackle because these sinkers can be attached to a leader by simple crimping operations. A split shot is a small, spherical, lead pellet having a comparatively deep notch at one side which will ordinarily extend slightly more than halfway through the pellet. A leader, or line, is placed in this notch and the sinker is then crimped to close the notch to set the sinker on the line. A knife-like spreader is required to spread the notch to remove the sinker from the line. Accordingly, the attachment or removal of split shot sinkers can be most effectively done by a crimping tool and a spreading tool.

The common operations mentioned above, and other simple operations associated with fishing and fishing tackle require several different tools which may be inconvenient for the fisherman to carry while he is fishing. The present invention was conceived and developed with such and other considerations in view and the invention comprises, in essence, a single composite tool for preparing lightweight fishing tackle which is capable of performing a number of varying operations. This fisherman's tool is small and is shaped somewhat like a jackknife. One end of this tool is essentially a multi-bladed jackknife in construction, but the other end, in combination with a lever, forms a unique flexing head to provide for shot crimping and spreading operations, and also, nipping and crushing of the end of a leader and tweezer gripping of small objects, all as will be hereinafter set forth.

In developing this improved tool, it was discovered that if the end of a slippery nylon leader, protruding from a knot in the leader, were crushed and spread, the possibility of the knot slipping out of the leader is greatly reduced. Thus, crushing and spreading an end of a leader is a novel solution to the common problem of monofilament leader knots slipping loose and releasing, as from a hook or from a line. Such leader material is very slippery, especially when it is wet and the problem of knot slipping has been encountered by practically every fisherman. Several solutions have been proposed. One is to tie complicated knots. Another is to burn a knob onto the tip of the leader. Suitable knots are difficult to tie and a burned knob at the tip of the leader is brittle, unreliable and difficult to form without damaging the knot or leader. The simple expedient of crushing and spreading the leader permits the end of the leader to be clipped close to the knot and also permits more simple knots to be tied in a leader with assurance that they will not slip out. Accordingly, one object of the invention is to provide a novel and improved fisherman's tool which may be used to crush and spread the end of a leader.

Another object of the invention is to provide a novel and improved fisherman's tool which is so versatile that it can be used for a number of other operations in preparing fishing gear, yet which is small, easily handled and carried.

Another object of the invention is to provide a novel and improved fisherman's tool which has a narrowed gripping end and which will easily and effectively grip and crimp split shot sinkers onto a line or leader as they are needed and which will quickly and easily open, or spread apart, the slit in such sinkers to remove them from a line or leader.

Another object of the invention is to provide a novel and improved fisherman's tool which combines a multi-blade jackknife-like unit with shot crimping, spreading, leader nipping and crushing components in a simple, effective and easy-to-use arrangement.

Another object of the invention is to provide a novel and improved fisherman's tool which provides in combination with the components above mentioned, a gripper tweezer for holding small objects.

Other objects of the invention are to provide in a novel and improved fisherman's tool, a simple, easily-manufactured, economical, rugged and durable article of manufacture.

With the foregoing and other objects in view, my present invention comprises certain constructions, combinations and arrangements of parts and elements as hereinafter described, defined in the appended claims, and illustrated in preferred embodiment in the accompanying drawing in which:

FIG. 1 is a perspective view of the improved fisherman's tool showing surfaces which will hereinafter be designated as the top, the front side and crimp-end of the tool, the crimp-end being shown as holding a split shot in position preparatory to crimping the same upon a leader; the view also showing a blade at the opposite knife-end of the unit as being partially open.

FIG. 2 is a fragmentary sectional detail, as taken from the indicated line 2—2 at FIG. 1 but on an enlarged scale, the view showing the blade end of the tool, a fragment of a blade in closed position in solid lines and the fragment of the blade in open position in dotted lines.

FIG. 3 is a perspective view similar to FIG. 1, but showing surfaces which will be hereinafter designated as the top and back side of the tool, with the lever at the top positioned for removing a split shot from a leader.

FIG. 4 is a fragmentary section as taken from the indicated line 4—4 at FIG. 3, but on an enlarged scale to better show the manner in which the slit of the split shot is spread apart to release it from a leader.

FIG. 5 is a front-side elevational view of the tool showing the lever positioned for squeezing the top and bottom members together to bring a pair of opposing cutting blades together as for cutting a leader and to also bringing opposing tweezer grippers together as for holding a small object.

FIG. 6 is a transverse sectional view as taken from the indicated line 6—6 at FIG. 5, but on a somewhat enlarged scale and illustrating diagrammatically, the manner in which a leader tip may be cut at the front side of the tool and the manner in which a leader tip may be crushed at the back side of the tool by the squeezing action of the lever.

FIG. 7 is a transverse sectional view as taken from the indicated line 7—7 at FIG. 5, but on an enlarged scale, and showing the distortion of the top and bottom surfaces as being exaggerated to better set forth the manner in which the surfaces of the tool are deflected when squeezed by the lever.

FIG. 8 is an enlarged view of an end portion of a leader showing a knot therein and the end crushed and spread according to the invention.

Referring more particularly to the drawing, the tool is built about a simple folded frame F to form an elongated handle. This frame is of a suitable rigid metal plate, of a material such as stainless steel, to avoid rusting when in use. This frame F is similar in form and size to the handle of a pocket knife and a group of folding blades are provided at one end of the handle as will be described.

In accordance with the figure description, this handle has an elongated top plate 10 and a similar opposing bottom plate 11 which normally lies in spaced parallelism to the top plate. These plates 10 and 11 are connected by a back wall 12 so that the frame is U-shaped in transverse section. However, the back wall 12 extends through only a portion of the longitudinal reach of the top and bottom plates commencing at the designated knife-end of the handle. Thus, the opposite crimp-end of the top and bottom plates 10 and 11 are cantilevered and can flex and be squeezed together as hereinafter described.

The knife-end of the handle, at the more rigid section where the back wall 12 holds the top and bottom plates 10 and 11 in position, is equipped with a group of blades 13 of various sorts which may be selected to be of advantage to a fisherman. The blades 13 are held by a pivot pin 14 extending through the top and bottom plates and these blades 13 will normally lie in a closed position between these plates. When a blade is opened, it is swung about the pivot 14 to an extended position from the handle, the same as a jackknife.

Any suitable, conventional arrangement may be used to secure a blade in its extended position. For example, a shoulder 15 is provided at the pivot end of each blade to abut against the rear edge of the back wall 12 as shown in broken lines at FIG. 2. The crimp of a crimped spring 16 at the inner side of the back wall then overreaches a spur 17 on the end of the blade to prevent the blade from accidentally swinging shut once it is opened.

The cantilevered portions of the elongated top and bottom plates 10 and 11 at the crimp-end of the handle are narrowed and are offset and sloped from the respective planes of the plate surfaces to form fingers 20 and 21 which taper toward each other. These fingers are normally spread apart at a spacing sufficient to hold a split shot S between them as illustrated at FIG. 1. As illustrated at FIG. 1, these fingers 20 and 21, extending from the cantilevered ends of the top and bottom plates 10 and 11, are narrowed being only approximately as wide as a split shot. This greatly facilitates the handling of a split shot when it is fitted between the fingers for connecting and crimping it onto a leader. To facilitate holding the split shot S, each finger includes a socket 22 near its tip, the respective sockets opposing each other as illustrated, and being somewhat elongated to hold split shot of different sizes, at different portions of the tapered fingers. These ends of these fingers 20 and 21 are squared and curved towards each other to form tweezer ends 23 as hereinafter further described.

The crimping of a split shot S to affix it to a leader L is effected by placing the shot between the fingers 20 and 21 and then flexing the cantilevered ends of the top and bottom plates 10 and 11 toward each other. This flexing movement may be accomplished by means of a lever 25 which is similar in structure to the lever of a common nail clipper. One end of the lever 25 is formed as a closed yoke and is pivotally connected to a hook in the end of a cylindrical post 26 which extends through aligned holes at the central portions of the cantilevered sections of the top and bottom plates 10 and 11. This lever presses against the top plate 10 and is angled to form a fulcrum point 27 near the post. Thus, when the handle portion of the lever 25 is depressed towards the top plate 10, the fulcrum point bears against the top surface of the post and lifts the post with respect to the top plate. The opposite end of the post is formed with a head 28 which bears against the underside of the bottom plate 11. Thus, when the lever is depressed to life the post, the bottom plate moves towards the top plate as illustrated at FIG. 5. Since the top and bottom plates 10 and 11 are interconnected by the back wall 12 along one side of the plates, the flexing of the plates may be accompanied by a longitudinal twisting action of the plates with respect to each other; however, such will not significantly modify the action of the unit.

The lever which crimps a split shot may also be used to open the slit in a split shot to remove it from a fishing line or leader. This is accomplished by a transverse wedge 29 upstanding from the face of the lever at an approximate center position on the lever. The lever 25 may be reversed on its cylindrical post 26 and then rotated to completely reverse its position with respect to the top surface and to the position illustrated at FIG. 3. The wedge 29 is then at the underside of the lever facing the surface of the top plate 10. A closed split shot S may then be placed upon the surface of the top plate 10 with the wedge 29 being at the closed slit in the shot. The slit is then opened by pressing the lever to push the wedge 29 into the shot slit as illustrated at FIG. 3. A shallow indentation 30 is provided in the top surface 10 to facilitate placing and holding the shot in position during this operation, the indentation 30 being best shown at FIG. 1. A tranverse hole 30a is formed in this dimple as illustrated in FIG. 1 to receive the wedge 29 when the unit is closed and not in use.

In addition to crimping and opening split shot, this handle H is provided with nipping and crushing jaws to cut off short ends of a leader and to crush the ends, the latter operation being desirable to prevent a possible slipping and untying of a knot as heretofore mentioned.

A pair of nipping jaws 31 and 32 are formed at the respective front edges of the top plate 10 and bottom plate 11, at the cantilevered sections of these plates adjacent to the post 26. Each nipping jaw 31 and 32 is formed as a tab of the plate material which is bent out of the plate of its respective top plate 10 and bottom plate 11 to be directed towards the opposite nipping jaw. The jaws are provided with opposing sharpened edges 33 and 34 which are angled when separated in a manner which will permit them to meet when the plates are pulled together by the lever 25 as illustrated at FIG. 5. It is to be noted that the nipping action is close to the limit of movement of the lever 25 as illustrated at FIGS. 5 and 6.

A pair of crushing jaws 35 and 36 are formed at the respective back edges of the top plate 10 and bottom plate 11, at the cantilevered sections of these plates adjacent to the post 26 and opposite the nipping jaws. Each crushing jaw 35 and 36 is formed as a tab of the plate material which is bent out of the plane of the respective top plate 10 and bottom plate 11 to be directed towards the opposite crushing jaw as best illustrated at FIG. 3. The jaws are provided with opposing rounded edges 37 and 38 which are angled when separated in a manner which will permit them to meet when the plates are pulled together by the lever 25. Ideally, the crushing jaws may be proportioned so that the edges 35 and 36 contact each other as the sharpened edges 33 and 34 of the nipping jaws 31 and 32 at the opposite side of the handle come together. However, this is not necessary since the material forming the frame F will be flexible and some flexing may occur to cause the edges 33 and 34 to come together as well as edges 37 and 38 coming together, even though one pair of edges may come together before the other pair does.

The flat tweezer ends 23, at the ends of the fingers 20 and 21, are also adapted to close when the sharpened edges of the nipping jaws come together and when the rounded edges of the crushing jaws come together. These tweezers 23 are thus able to hold small objects with a firm, tight grip.

The preferred mode of manufacture of the frame F is by stamping operations because of the economies of production. It is to be noted that when the frame F is formed as a stamping of a selected metal, the nipping edges 33 and 34 are sharpened, the crushing jaw edges 37 and 38 are rounded and the tweezer edges 23 are flattened either before or after the stamping operations are completed. Ordinarily, the conventional operations of forming the frame and of finishing the edges are precise so that all edges may contact simultaneously when the tool closes. However, this is not essential and if a small misalignment of these several edges does occur so they will not meet precisely the same instant as the tool is closed, the flexibility of the frame F permits the tool to operate satisfactorily in all respects. This is so, even if these edges are positioned a few thousands or even hundredths of an inch from their proper theoretical positions.

The use and operation of the invention as a fisherman's tool is manifest from the foregoing description. With a careful selection of blades 13 to supplement the crimping, spreading, nipping and end-crushing actions of the tool, this tool can perform many operations the fisherman needs performed. The invention can find utility as a tool for other purposes. For example, the nipping edges 31 and 34, the crushing edges 37 and 38, the tweezer ends 23 can be modified to perform various functions associated with a manicure set and the various blades 13 can likewise be modified for such a purpose.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. A fisherman's tool for holding and crimping a split shot onto a line comprising:
   a. an elongated handle having the general proportions of a jackknife handle including an elongated, flexible top plate member and a corresponding opposing elongated flexible bottom plate member which normally lies in approximate spaced parallelism with the top plate member, and a wall means interconnecting one end portion of the top plate member and of the bottom plate member to hold the members apart with the other end portion of each member being cantilevered from the connection wall means;
   b. a lever means at the cantilevered portions of the plate members adapted to flex the cantilevered end portions of the members toward each other; and
   c. a narrowed finger projecting from the end of the cantilevered end portion of each member to lie in opposition with the finger projected from the other end portion, with the width of each finger being approximately as wide as a split shot and with the fingers having slightly dished opposing surfaces adapted to hold an open split shot when the shot is to be fitted to a line and the shot to be closed by squeezing the fingers together.

2. In the fisherman's tool defined in claim 1, wherein:

opposing nipper edges are located at one side edge of the cantilevered end portions of the members;
   opposing crusher edges are located at the other side of the cantilevered end portions of the members; and
   opposing tweezer surfaces are located at the extended ends of the fingers;
   and wherein:
   the aforesaid nipper edge, crushing edge and tweezer surface of one member is adapted to approximately simultaneously engage the respective opposing nipper edge, crushing edge and tweezer surface of the opposing member, whenever the lever means flexes the cantilevered end portions of the members towards each other.

3. In the fisherman's tool defined in claim 1, wherein:

the lever means includes a post extending through apertures in the cantilevered portions of the top plate and bottom plate members, including a head on the post adapted to engage the lower surface of the bottom plate member; and
   a lever arm pivotally connected to the upper end of the post, said lever arm having a bend adjacent to the post to define a fulcrum edge adapted to engage the upper surface of the upper member with the lever extending away therefrom, whereby the lever may be pushed downwardly and against the upper member and thereby pull said members together, and said lever member being also adapted to be rotated about and over the post to move the fulcrum point away from the face of the upper member to permit the lever to lie over the face of the upper member when not in use;

a wedge outstanding from the lever arm adapted to be directed towards the face of the upper member when the lever is in its non-use position; and a depression in the face of the upper member opposite the wedge whereby to hold a closed split shot and to permit the wedge to open the same when the lever arm is moved against the upper member.

4. In the fisherman's tool defined in claim 3, including:

a slot in the depression adapted to permit the wedge to extend into the slot when the lever lies over and against the face of the upper member when not in use.

5. A fisherman's tool or the like comprising:

a. an elongated handle having the general proportions of a jackknife handle including an elongated, flexible top plate member and a corresponding opposing elongated flexible bottom plate member which normally lies in approximate spaced parallelism with the top plate member, and a wall means interconnecting one end portion of the top plate member and of the bottom plate member to hold the members apart with the other end portion of each member being cantilevered from the connection wall means;

b. a tool means on the cantilevered end portion of each member, each tool means being adapted to oppose and to move towards the tool means on the other member whenever the cantilevered end portions are flexed towards each other by the lever means, whereby said tool means will act upon an object placed between them; and c. a lever including a post extending through apertures in the cantilevered portions of the top plate and bottom plate members, including a head on the post adapted to engage the lower surface of the bottom plate member; and d. a lever arm pivotally connected to the upper end of the post, said lever arm having a bend adjacent to the post to define a fulcrum edge adapted to engage the upper surface of the upper member with the lever extending away therefrom, whereby the lever may be pushed downwardly and against the upper member and thereby pull said members together, and said lever member being also adapted to be rotated about and over the post to move the fulcrum point away from the face of the upper member to permit the lever to lie over the face of the upper member when not in use;

e. a wedge outstanding from the lever arm adapted to be directed towards the face of the upper member when the lever is in its non-use position; and f. a depression in the face of the upper member opposite the wedge whereby to hold a closed split shot and to permit the wedge to open the same when the lever arm is moved against the upper member.

* * * * *